Patented Oct. 11, 1949

2,484,497

UNITED STATES PATENT OFFICE 2,484,497

PREPARATION OF SUBSTITUTED LOWER ALIPHATIC ACIDS

Hugh J. Hagemeyer, Jr., Kingsport, Tenn., assignor to Eastman Kodak Company, Rochester, N. Y., a corporation of New Jersey No Drawing. Application May 15, 1946, Serial No. 670,032

3 Claims. (Cl. 260—514)

This invention relates to the preparation of carboxylic acids and more particularly to the preparation of substituted aliphatic carboxylic acids by the reduction of β-lactones obtained from aromatic aldehydes, or aromatic ketones, and polymers of such β-lactones.

The β-lactones employed as starting materials in my invention may be prepared by condensing a ketene with an aromatic aldehyde or an aromatic ketone in the presence of a suitable catalyst, such as a Friedel-Crafts type catalyst, or in the presence of sodium, potassium or lithium salts of organic carboxylic acids, for example, sodium acetate at temperatures below 50° C. The use of a Friedel-Crafts catalyst in forming β-lactones is described in U. S. Patent 2,356,459 of August 22, 1944; and the reaction of ketene with furfural and benzaldehyde in the presence of potassium acetate as the catalyst is described by C. D. Hurd, J. A. C. S. 55, 275 (1933). The reaction for preparing these β-lactones can be represented by the equation

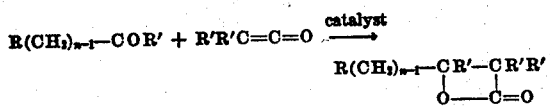

wherein $n$ is any whole number 1, 2, 3, 4, etc.; R' may be hydrogen, alkyl, e. g. methyl or ethyl, and aryl, e. g. phenyl; and R may be aryl, e. g. phenyl or naphthyl, and cycloalkyl, e. g. cyclohexyl or a heterocyclic group, e. g. furyl.

Polymerization of these lactones can be carried out as described in U. S. Patent 2,361,036 of August 22, 1944.

An object of the invention is to provide a method of preparing organic carboxylic acids of the general formula

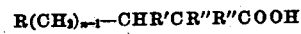

wherein $n$ represents a whole number 1, 2, 3, 4, etc; R may be aromatic, e. g. phenyl or naphthyl, and cycloaliphatic, e. g. cyclohexyl, or furyl; and R' and R" may be hydrogen, methyl, ethyl, phenyl, etc.

Another object of the invention is to provide a method for the hydrogenation of β-lactones made from aromatic aldehydes and aromatic ketones, and low molecular polymers of such β-lactones, to carboxylic acids.

Still another object is to prepare ester lactones by the hydrogenation of the addition products of ketenes with furfural, said ester-lactones having the following general structure:

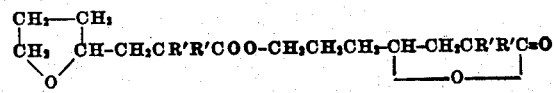

wherein R' may be hydrogen, methyl, ethyl, phenyl, etc.

Other objects will become apparent hereinafter.

In accordance with the invention, it has been discovered that substituted aliphatic carboxylic acids can be prepared by the hydrogenation of the β-lactones obtained from aromatic aldehydes and aromatic ketones, and also by hydrogenation of the low molecular weight polymers of such β-lactones, in the presence of a suitable catalyst at elevated temperatures and pressures.

The objects of the invention may thus be accomplished in accordance with one feature of the invention, by hydrogenating the selected β-lactone in the presence of a catalyst, such as Raney nickel. The hydrogenation converts the lactone group to a carboxylic acid as shown in the following equation which illustrates the basic reaction of the invention.

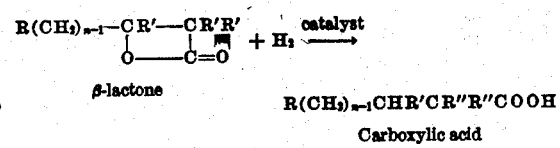

In this equation, R, R', R" and $n$ have the significance described above.

The invention will be further understood by reference to the following examples.

Example I

Ketene was passed in through a high speed stirrer into 150 grams of benzaldehyde containing 0.5 gram of anhydrous sodium acetate while maintaining a reaction temperature of 30–40° C. The β-phenyl-β-propiono lactone thus produced was then placed in a stirrer type copper lined autoclave and hydrogenated using Raney nickel catalyst at 180° C. and 700 pounds per square inch until no more hydrogen was absorbed. Distillation gave 84 grams of β-cyclohexyl propionic acid. B. P. 141° C. $N_D^{30}$ 1.4624, N. E. 155. The reaction may be expressed by the following equation:

$C_6H_5CHO + CH_2=C=O \xrightarrow{\quad}$

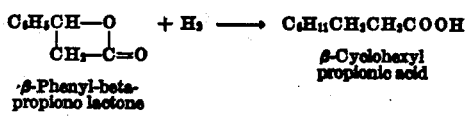

Example II 200 grams of acetophenone containing 0.2 gram of $ZnCl_2$ was reacted with ketene (0.46 mol./hr.) at 0–10° C. for 8 hours. The catalyst was neutralized with 5% caustic solution and the mixture was filtered. Reduction with hydrogen at 180° C. and 1000 pounds per square inch gave 43 grams of β-cyclohexyl butyric acid. B. $P_{10}$ 158° C. $N_D^{30}$ 1.4632 N. E. 170. The reaction may be represented as follows:

$C_6H_5COCH_3 + CH_2=C=O \longrightarrow$

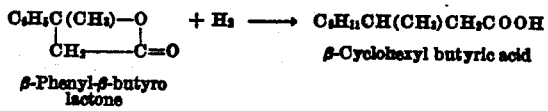

Example III 250 grams of furfural containing 0.5 gram of anhydrous potassium acetate was treated with ketene while maintaining a reaction temperature of 30 to 40° C., thereby forming β-(2-furyl)-β-propiono lactone. When an increase in weight of 100 grams had been obtained, the reaction mixture was diluted with 400 grams of dioxane and reduced to the acid at 165° C. over Raney nickel. Distillation gave 140 grams of β-(2-tetrahydrofuryl) propionic acid. B. P. 126° C. N. E. 128. The reaction is as follows:

$C_4H_3CHO + CH_2=C=O \longrightarrow$

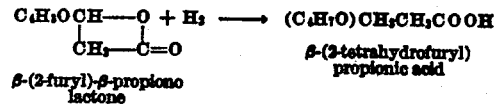

As indicated in the above examples, the simple lactones may be hydrogenated as such, or in accordance with another feature of the invention, they may be partially polymerized to the polyesters of β-hydroxy acids and then reduced to substituted acids. Polymerization is carried out as described in U. S. Patent 2,361,036. β-lactones have a tendency to form a dimer which has a greater heat stability than the simple lactone. The dimer and higher polymers have the advantage over the simple lactone in that the reduction takes place readily at lower temperatures and pressures. This fact permits the preparation of aryl substituted aliphatic acids in accordance with my invention as shown in the following example.

Example IV 200 grams of benzaldehyde containing 0.2 gram of $ZnCl_2$ were reacted with ketene at 0–10° C. The catalyst was washed out with 5% alkali. One gram of $K_2CO_3$ was added and the β-phenyl-β-propiono lactone was heated at 80° C. for one hour under which conditions a low molecular weight polymer of this lactone was formed. The polymer mixture was placed in a small stirrer type autoclave and reduced over Raney nickel at 110 to 120° C. Distillation of the product gave 102 grams of β-phenyl propionic acid, B. $P_{10}$ 145° C. Crystals were obtained upon cooling. M. P. 46 to 48° C. The following equation represents the reaction in which $x$ indicates the extent of polymerization and may be a whole number:

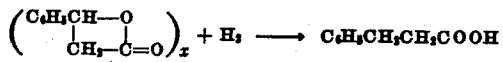

In accordance with another feature of the invention, ester-lactones may be prepared by the hydrogenation of the addition products of ketenes with furfural. These ester-lactones are valuable plasticizers for molding materials made from cellulose esters.

Example V

Ketene was passed into 300 grams of furfural containing 0.5 gram anhydrous potassium acetate until the theoretical increase in weight had taken place, thus indicating the formation of the β-lactone of β-(2-furyl)-β-hydroxy propionic acid as illustrated in the following equation:

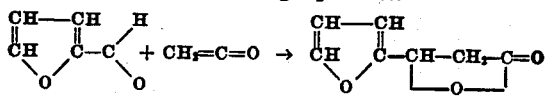

This β-lactone was diluted with 400 grams of dioxane and placed in a stirrer type autoclave with 5 grams of Raney nickel and reduced with hydrogen. The reduction was conducted in two stages of temperature. The first reduction was conducted at a temperature of 160° C. for 4 hours and the β-lactone was reduced to β-(2-tetrahydrofuryl)-propionic acid which was then further reduced at a temperature of 210° C. to produce zeta hydroxy-gamma-heptolactone as shown in the equation.

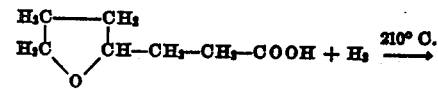

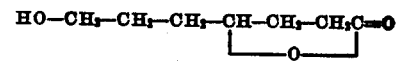

The zeta hydroxy-gamma-heptolactone reacts with the β-(2-tetrahydrofuryl)-propionic acid to yield an ester-lactone as shown in the equation.

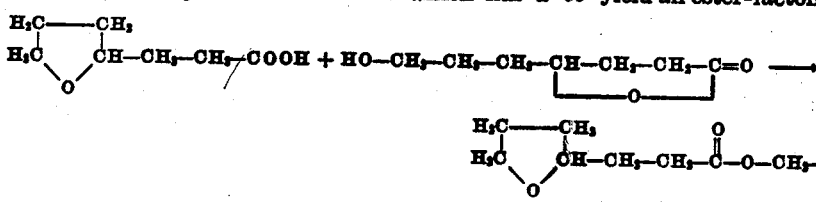

This example presents a new method for forming this ester-lactone which is described and claimed in Hasche and Gordon Patent 2,364,358 of December 5, 1944.

These examples illustrate preferred conditions for making substituted aliphatic carboxylic acids by the reduction of the β-lactones obtained from aromatic aldehydes and aromatic ketones, and polymers of such β-lactones. It will be understood that a relatively large number of such acids can be produced in a like manner from comparable lactones and ester-lactones. In general, the reaction can be carried out at a temperature between 90–240° C. although the preferred ranges are: for simple lactones, 130–190° C.; for dimers and/or polymers, 90–190 C.; and ester lactones, 210–230° C. Pressures up to 150 atmospheres are desirable. Higher pressures may be used, but there appears no substantial advantage in employing such higher pressures. The hydrogenation may be carried out in the presence of inert diluents such as dioxane, cyclohexane, and heptane.

With lactones containing furfural and derivatives thereof a diluent is preferably employed to aid in controlling the rate of the reaction.

The Raney nickel catalyst employed in the reduction of the β-lactones described herein may be prepared as shown in U. S. Patents 1,628,190 and 1,915,473 by a method of leaching out aluminum from a nickel-aluminum alloy with sodium hydroxide. While Raney nickel is the preferred catalyst, other suitable hydrogenation catalysts may be used such as nickel on kieselguhr.

I claim:

1. The process for preparing substituted aliphatic carboxylic acids which comprises hydrogenating in a closed vessel in the presence of a Raney nickel hydrogenation catalyst at a temperature within the range of 90° C. to 240° C. and at a pressure within the range of 700 to 2000 pounds per square inch the β-lactones having the general formula:

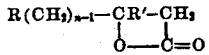

wherein R is a phenyl group, and R' represents a member selected from the class consisting of a hydrogen atom and a methyl group, and $n$ represents a small whole number from 1 to 4.

2. The process for preparing β-cyclohexyl propionic acid which comprises hydrogenating β-phenyl-β-propiono lactone in a closed vessel at a pressure of approximately 700 pounds per square inch and a temperature of approximately 180° C. and in the presence of a Raney nickel hydrogenation catalyst.

3. The process for preparing β-cyclohexyl butyric acid which comprises hydrogenating β-phenyl-β-butyro lactone in a closed vessel at a pressure of approximately 700 pounds per square inch and a temperature of approximately 180° C. and in the presence of a Raney nickel hydrogenation catalyst.

HUGH J. HAGEMEYER, Jr.

REFERENCES CITED

The following references are of record in the file of this patent:

UNITED STATES PATENTS

| Number | Name | Date |
|---|---|---|
| 2,130,989 | Schimmelschmidt | Sept. 20, 1938 |
| 2,333,718 | Heisel | Nov. 9, 1943 |
| 2,361,036 | Kung | Oct. 24, 1944 |
| 2,364,358 | Hasche et al. | Dec. 5, 1944 |

OTHER REFERENCES

Adkins, "Reactions of Hydrogen," U. of Wisconsin Press, 1937, page 78.

Boese, "Diketene," Article in Ind. & Eng. Chem., January 1940, page 20.